Dec. 27, 1938.  H. KERSHAW  2,141,992
DIRECTION INDICATOR FOR VEHICLES
Filed June 15, 1937  2 Sheets-Sheet 1
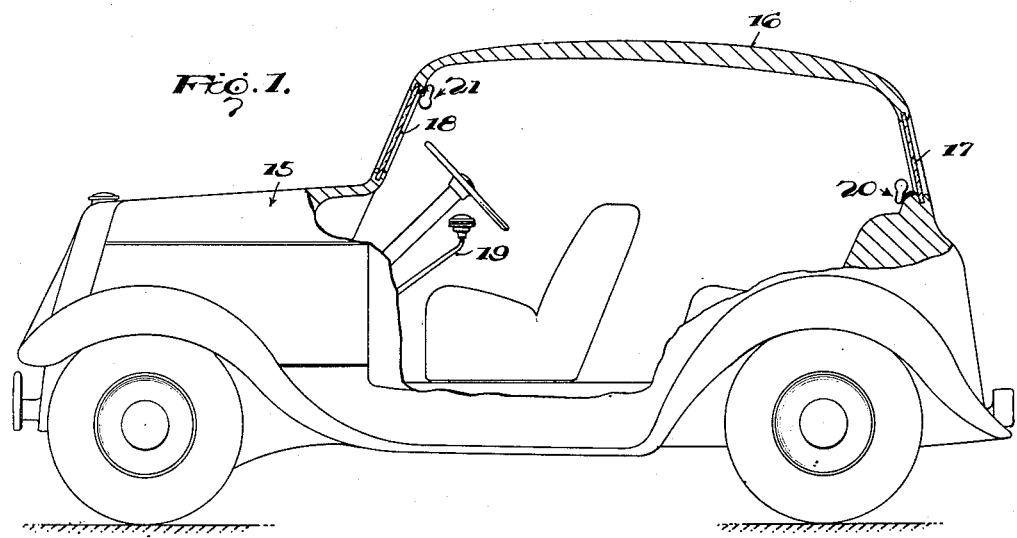
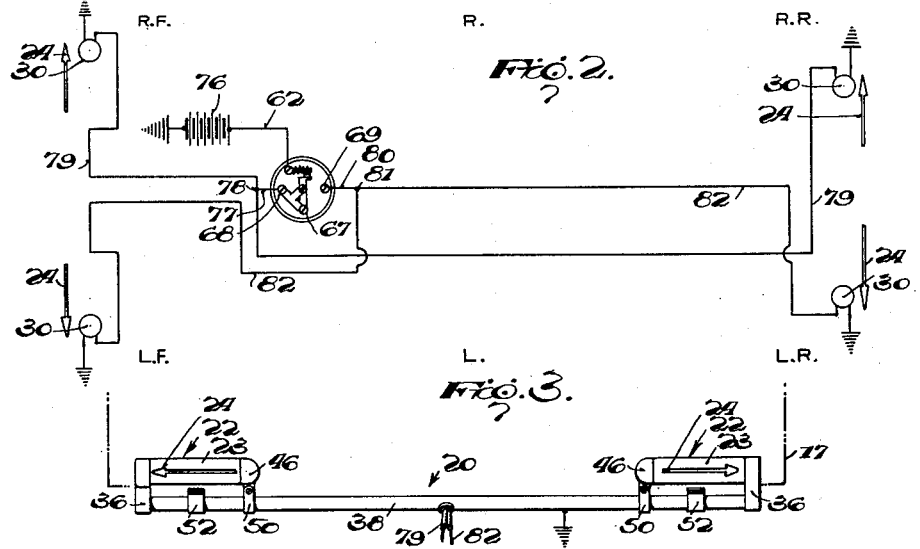
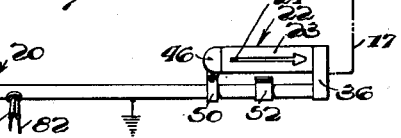
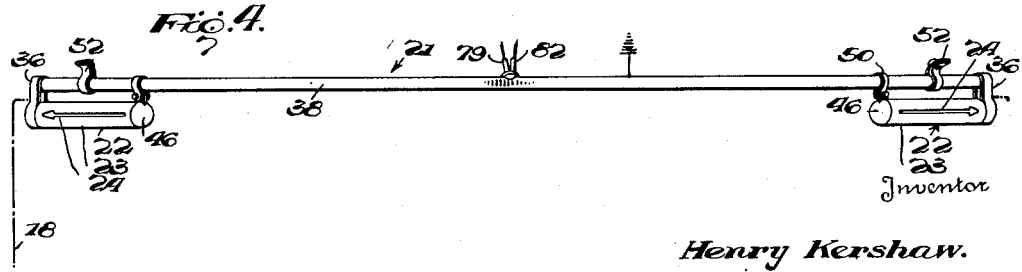
Inventor
Henry Kershaw.
By
Attorney Dec. 27, 1938.   H. KERSHAW   2,141,992
DIRECTION INDICATOR FOR VEHICLES
Filed June 15, 1937   2 Sheets-Sheet 2
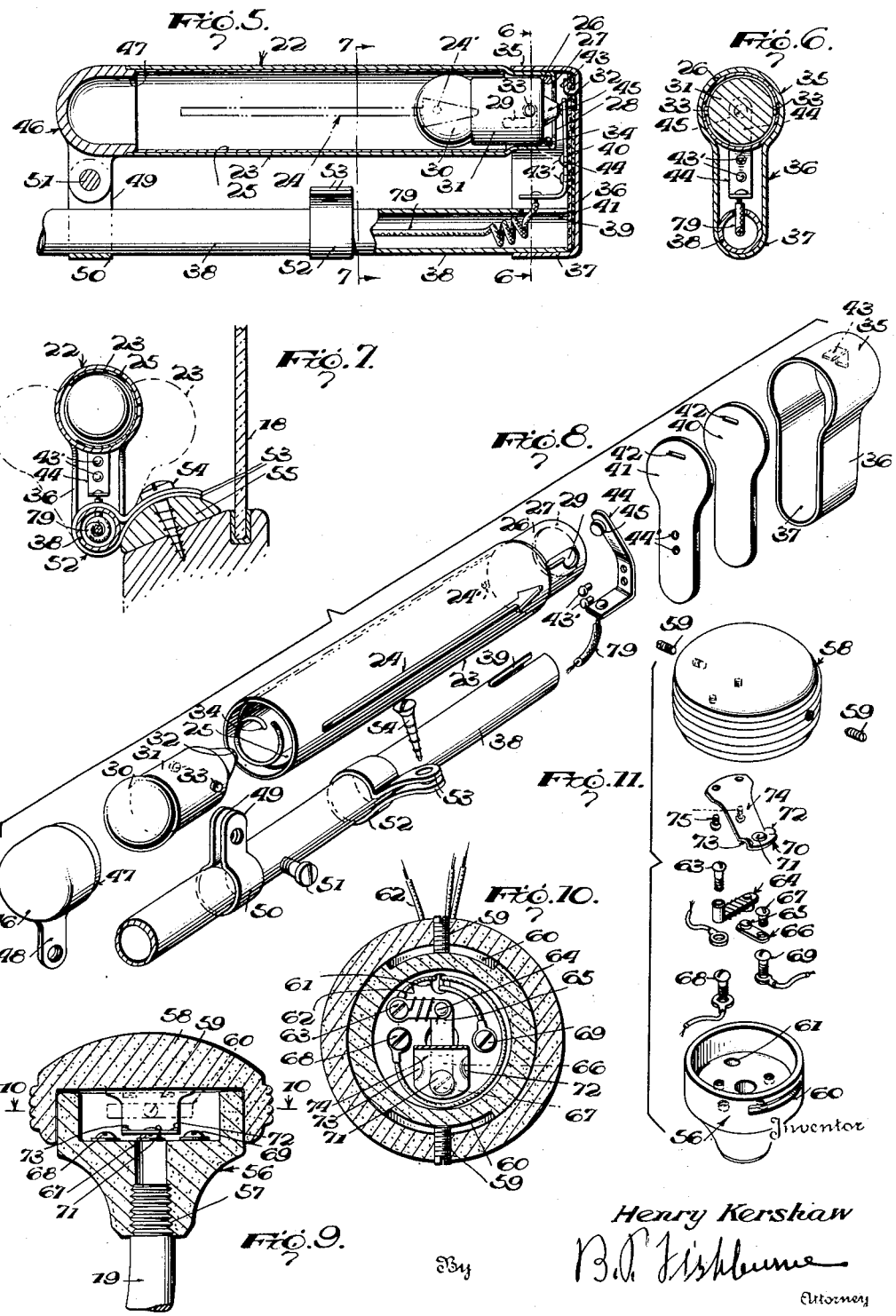

Patented Dec. 27, 1933

2,141,992

UNITED STATES PATENT OFFICE 2,141,992

DIRECTION INDICATOR FOR VEHICLES

Henry Kershaw, Kearney, N. J.

Application June 15, 1937, Serial No. 148,389

7 Claims. (Cl. 177—329)

My invention relates to direction indicators for vehicles, such as automobiles or the like.

An important object of the invention is to provide means of the above mentioned character, embodying direction indicating unit or units which are located within the body of the automobile, and are visible at all times from the interior and exterior of the vehicle, whereby the driver is advised as to the operativeness of the units.

A further object of the invention is to provide means to permit of the proper installing of the direction indicating units upon the body of a modern automobile, without altering or disturbing its construction and arrangement.

A further object of the invention is to provide a direction indicating element which will employ the ordinary or standard electric light bulbs, and which are so constructed that the bulbs may be readily inserted and removed therefrom.

A further object of the invention is to provide a device of the above mentioned character which is neat and attractive in appearance.

A further object of the invention is to provide a switch device which is carried by the gear shift lever and will serve as a handle or knob for the same.

A further object of the invention is to provide means to cause the visual signals produced by the device to flicker when operating.

Other objects and advantages of the invention will be apparent during the course of the following description.

In the accompanying drawings forming a part of this application and in which like numerals are employed to designate like parts throughout the same, Figure 1 is a side elevation of an automobile, parts broken away, showing my apparatus applied thereto, Figure 2 is a diagrammatic view of the circuits and associated elements included in the apparatus embodying my invention, Figure 3 is a side elevation of the rear direction indicating unit, Figure 4 is a similar view of the front direction indicating unit, Figure 5 is a central vertical longitudinal section through one of the direction indicators, Figure 6 is a transverse section taken on line 6—6 of Figure 5, Figure 7 is a similar view taken on line 7—7 of Figure 5, Figure 8 is an exploded perspective view of the direction indicator, Figure 9 is a central vertical section through the switch device, Figure 10 is a horizontal section taken on line 10—10 of Figure 9, and, Figure 11 is an exploded perspective view of the switch device.

In the drawings, wherein for the purpose of illustration is shown a preferred embodiment of my invention, the numeral 15 designates a vehicle, such as an automobile, having the usual body 16, including a rear window 17 and a front window or wind shield 18. The numeral 19 designates a usual gear shift lever. My signal apparatus comprises rear and front direction indicating units 20 and 21, which are substantially identical, and a detailed description of one will suffice for both. Each direction indicating unit embodies a pair of direction indicators 22, which are substantially identical. Each direction indicator comprises a preferably cylindrical tube or casing 23, preferably formed of opaque material, such as metal or the like. The tube 23 is provided upon its outer side with a longitudinally extending opening 24, in the shape of an arrow and having the arrow-head pointing outwardly to indicate the direction. The arrow 24 to the right points outwardly to the right and the arrow 24 to the left points outwardly to the left. When the interior of the tube or casing 23 is illuminated, the light shines through these arrow shaped openings, which are thereby rendered visible. If desired, these arrow shaped openings may be covered by a sheet of transparent colored material 25, and this transparent sheet may be red or green, or any other suitable color. This sheet is inserted in the tube and will be held in place by engagement with the bulb, to be described, or by any other suitable means. Upon the inner side of the tube or casing 23 opposite to the arrow shaped opening is a peep-hole 24', through which the light shines for appraising the operator of the operative condition of the direction indicator. The tube or casing 23 is provided at its outer end with a reduced socket-extension 26, having an end or bottom 27, provided with a central opening 28. The socket-extension 26 also has an L-shaped slot 29, the inner end of the longitudinal portion of which extends through the outer end of the sleeve 23 for a short distance, as shown. The numeral 30 designates an electric light bulb of the usual construction, comprising an outer terminal 31 and an inner terminal 32. The outer terminal 31 is adapted to fit within and electrically contact with the socket-extension 26 and has a radial pin 33, to enter the L-shaped slot 29, and the outer terminal also engages a spring 34, which moves the bulb forwardly so that the pin 33 is held within the transverse portion of the L-shaped slot, against displacement. When the tube or sleeve 23 is separated from its supporting means, it is obvious that by engaging the pin 33, the bulb may be turned so that the pin will enter the longitudinal portion of the slot whereby the bulb may be moved longitudinally of and from the tube or casing 23. The socket-extension 26 is adapted to fit snugly within a socket 35, to have electrical contact therewith and to be removed therefrom. This socket 35 is carried by a hollow arm 36, having a smaller socket 37 at its opposite end, receiving one end of a tube 38. The socket 37 is rigidly attached to the tube 38 and may be soldered or welded thereto, as desired. The elements 23, 36 and 38 are preferably formed of metal, so that they have electrical conductivity, and the tube 38 is grounded, as will be referred to hereinafter. The tube 38 has an opening 39 formed therein and arranged within the hollow arm 36. The numerals 40 and 41 designate insulating elements or strips, shaped to fit within the hollow arm 36 and its sockets and are arranged one upon the other. At their upper ends, these insulating strips have slots 42, to receive a tongue 43, stamped from the back of the socket 35, and then bent down over the strips 40 and 41, to hold the upper ends of the same in place, while the inner or lower ends of the strips are held in position by the tube 38. The numeral 44 designates a resilient contact element fixedly attached to the insulating strips 41 by rivets 43', passing through openings 44' in the insulating strip 41. At its free end the resilient contact 44 has a contact point 45 to engage the inner terminal 32 of the electric light bulb. The inner end of the tube or casing 23 is held against displacement by a cap 46, having a reduced end 47 to enter the tube or casing 23. This cap has an apertured knuckle 48, arranged between spaced apertured knuckles 49, of a ring-clip 50, and a screw 51 passes through and connects the apertured knuckles and also contracts the ring-clip 50 so that it is clamped to the tube 38.

The rear direction indicating unit is positioned inwardly of and near the rear window, and is held in place by ring-clips 52, receiving the tube 38 and these ring-clips have apertured knuckles 53, held in place by screws 54. These screws 54 are the usual screws employed to hold the beading 55 of the window frame in place. In a similar manner, front direction indicating unit may be held in place. In connection with the rear indicating unit it will be seen that the tube 38 is beneath the window frame while the arms 36 project up beyond the same so that the direction indicators 22 are visible through the rear window 17. These indicators may also be swung toward or from the window, as the tube 38 may turn within the ring-clips 52. Instead of arranging the direction indicators near the bottom of the window 17 they may be arranged near or at the top of the same, if desired. The forward indicator unit 21 is arranged at the top of the front window or wind shield, as shown. If desired, the front or wind shield and the indicators project downwardly over the wind shield, as shown. If desired, the front indicator unit may be arranged at the bottom of the window 18. Further, the tube 38 of the front or rear indicator units will of course conform to the shape or curvature of the windows.

A manually operated switch device is employed to actuate the several indicators. This switch device is mounted upon the gear shift lever 19 and serves as a knob or handle for the same. This switch device, Figures 1, 9, 10 and 11 embodies an insulating casing 56, having a screw threaded engagement with the lever 19, as shown at 57.

A cap 58 is mounted upon the casing 56 to turn thereon, and this cap carries screws 59, to enter segmental grooves 60, formed in the casing 56. The screws and grooves serve to limit the turning movement of the cap 58 and also to hold the cap upon the casing 56. The cap is also preferably formed of insulating material. The cap 56 has an opening 61, for the passage of a wire 62, connected with a binding post 63. This binding post is connected with a thermostatic device 64, to intermittently engage and disengage a stationary contact or binding post 65, engaging a stationary conductor strip 66, in electrical connection with a stationary contact or binding post 67. The numerals 68 and 69 designate stationary contacts or binding posts, which are spaced 90° from the binding post 67. A movable contact head 70 is provided, to alternately engage stationary contacts 67 and 69; and contacts 67 and 68. The contact head 70 has a central spherically curved socket 71 to receive the stationary contact 67 and outer semi-spherical sockets 72 and 73, to receive contacts 67 and 69; and 68 and 67 respectively. The contact head 70 is carried by a resilient arm 74, attached to the cap 58 by means of screws or rivets 75 or the like. As stated, the elements 56 and 58 are formed of insulating material.

For the purpose of convenience the indicators 22 will be designated R. F., R. R., L. F., and L. R., in Figure 2, meaning right front, right rear, left front and left rear respectively, and will be referred to by these letters. As shown in Figure 2, the numeral 76 designates a source of current, the positive pole of which is connected with the wire 62, while the negative pole of the source of current is grounded to the frame of the automobile. Connected with the stationary contact 68 is a wire 77, connected at 78 with a wire 79, one end of which is connected with the resilient contact 44 of the R. F. direction indicator. The opposite end of the wire 79 is connected with the resilient contact 44 of the R. R. indicator. These resilient contacts engage the inner terminal 32 of the bulbs while the outer terminal 31 of these bulbs are in electrical connection with the tube 38, which is grounded to the frame of the automobile. The wire 79 extends through the tube 38. In a similar manner, the wire 80 is connected at 81 with a wire 82. One end of the wire 82 is connected with the resilient contact 44 of the L. F. direction indicator while the opposite end of the wire 82 is connected with the resilient contact 44 of the L. R. indicator. The wire 82 also passes through the tubes 38.

The operation of the apparatus is as follows:
When the contact head 66 is in the neutral intermediate position, engaging the stationary contact 67, all direction indicators are inactive. Should it be desired to produce signals indicating that the automobile will be or is turning to the right, the operator turns the cap 58 clockwise, and this causes contact head 66 to engage and electrically connect stationary contacts 67 and 68. When this is done, current will flow from the positive pole of the source of current 76, through wire 62, contact 67, contact head 70, contact 68, through a portion of the wire 79 to the bulb of the R. F. indicator and through a portion of the wire 79 to the bulb of the R. R. indicator, and then through the grounds to the opposite pole of the source of current 76. The R. F. and R. R. indicators are therefore caused to glow. When the cap 58 is returned to the neutral position the R. F. and R. R. indicators cease to glow, and by turning the cap 58 counter-clockwise, the L. F. and L. R. indicators will glow, as is obvious.

It is to be understood that the form of my invention is to be taken as a preferred example of the same and that various changes in the shape, size, and arrangement of parts, may be resorted to, without departing from the spirit of my invention or the scope of the subjoined claims.

Having thus described my invention, I claim:

1. A signal device for vehicles comprising, a tube to be attached to the vehicle, a hollow arm mounted upon the tube and having a socket, a casing having a signal element adapted to be illuminated and provided with a socket-extension for insertion within said socket, an electric bulb for insertion within the casing and having an outer terminal to engage within the socket extension and also having an inner terminal, a contact element arranged within the hollow arm and insulated therefrom to engage the inner terminal, and a wire extending through the tube and connected with the contact element.

2. A signal device for vehicles comprising, a tube to be secured to the vehicle, a hollow arm mounted upon the tube and having a socket, a casing having a signal element adapted to be illuminated and provided at one end with a socket-extension for insertion within the socket and to be removed therefrom, an electric bulb to be arranged within the casing and having an outer terminal to engage within the socket-extension and also having an inner terminal, a contact element arranged within the hollow arm and insulated therefrom and adapted to engage the inner terminal, a wire extending through the tube and connected with the contact element, a cap detachably connected with the end of the casing remote from the socket-extension, and means to mount the cap upon the tube.

3. A signal device for vehicles comprising, a support having a socket, a casing having a signal element adapted to be illuminated and provided with a reduced socket-extension for insertion within the socket and to be removed therefrom, said reduced socket-extension having a generally L-shaped slot extending through the end of the casing, an electric light bulb for insertion within the casing and having an outer terminal to engage within the socket-extension and also having an inner terminal, a contact element arranged within the socket and insulated therefrom and adapted to engage with the inner terminal, and a pin secured to the outer terminal to engage within said L-shaped slot.

4. In a direction indicator for vehicles, a rod extending transversely of the vehicle near an end window of the same, means to mount the rod upon the vehicle so that it may turn upon its longitudinal axis, elongated casings arranged near the ends of the rod and extending longitudinally of the same, said casings having direction indicating means adapted to be illuminated, arms fixedly attached to the rod and supporting the casings so that they may be shifted with respect to the window by turning the rod, and electric light bulbs arranged within the casings to illuminate the same.

5. In a direction indicator, the combination with an automobile body having an end window, the window including a bead and screws to hold the bead in place, of a tube arranged within the body and extending longitudinally of the window adjacent to the bead, said tube having circular portions, ring-clips receiving the circular portions of the tube and having apertured knuckles to receive the screws which hold the bead in place, elongated casings arranged near the ends of the tube and extending longitudinally thereof and having direction indicating arrows, arms secured to the tube and supporting the casings, electric light bulbs within the casings, and wires extending through the tube for connection with the bulbs.

6. In a direction indicator for vehicles, a tube extending transversely of the vehicle body and longitudinally of the window adjacent to the bead, attaching elements adapted to be held in place by the screws for holding the bead in place, said attaching element holding the tube, elongated casings carried by the tube near its ends and having direction indicating devices which are adapted to be illuminated, electric light bulbs within the casings, and wires extending through the tube and connected with the bulbs.

7. A signal device for vehicles comprising a rod, an arm attached to the rod and extending radially therefrom, an elongated casing having a signal element adapted to be illuminated, said casing extending longitudinally of the rod and having one end mounted upon the arm, an electric light bulb mounted within the casing to illuminate the same, a cap detachably connected with the end of the casing remote from the arm, and adjustable means connecting the cap with the rod.

HENRY KERSHAW.